R. E. RELYEA.
TIRE VALVE.
APPLICATION FILED DEC. 19, 1914.

1,151,044.

Patented Aug. 24, 1915.

WITNESSES
Robert N. Van Behida
Virginia C. Spratt.

INVENTOR
Ralph E. Relyea
BY
Raymond A. Parker
ATTORNEY

UNITED STATES PATENT OFFICE.

RALPH E. RELYEA, OF DETROIT, MICHIGAN.

TIRE-VALVE.

1,151,044.	Specification of Letters Patent.	Patented Aug. 24, 1915.

Application filed December 19, 1914. Serial No. 878,145.

*To all whom it may concern:*

Be it known that I, RALPH E. RELYEA, a citizen of the United States, residing at Detroit, county of Wayne, State of Michigan, have invented a certain new and useful Improvement in Tire-Valves, and declare the following to be a full, clear, and exact description of the same, such as will enable others skilled in the art to which it pertains to make and use the same, reference being had to the accompanying drawings, which form a part of this specification.

This invention relates to a device for regulating the amount of air introduced into a pneumatic tire, and for giving alarms when the pressure exceeds the desired amount and when the pressure falls below the desired point.

Figure 2:
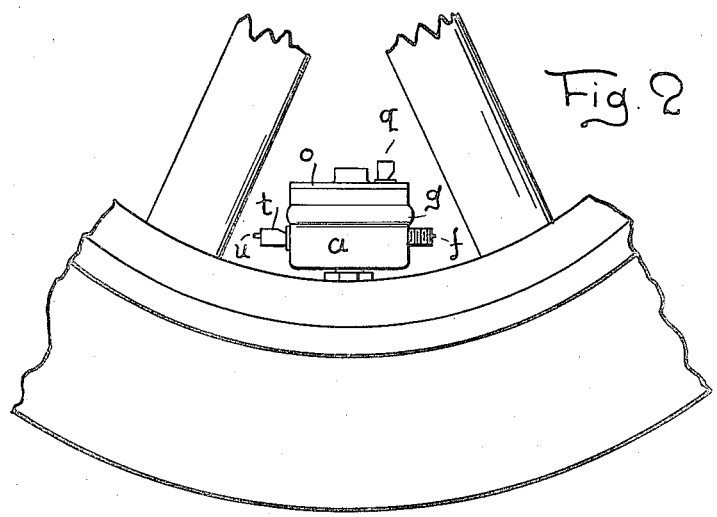
Figure 1:
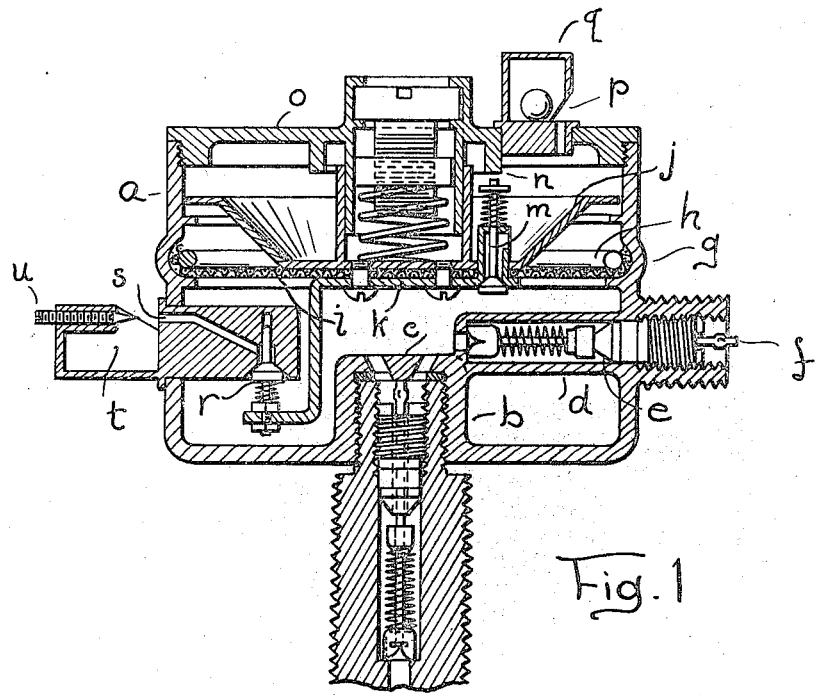

In the drawings,—Figure 1 is a section. Fig. 2 is an elevation showing the device applied to the tire.

*a* is a shell cylindrical in form and provided at the bottom with an inwardly projecting boss *b* screw threaded on the inside to screw over the ordinary valve stem of a tire. A portion *c* of the boss strikes the valve stem of the tire valve and holds it open when the device is screwed upon the tire valve. This tire valve is unnecessary with the device in place, but in order to avoid the necessity of removing this valve, I employ this arrangement, which holds the valve open. The shell *a* is provided with an integral valve casing *d* which extends inwardly into the shell casting and also outwardly therefrom. The outward portion is screw threaded to provide for a connection for a source of compressed air not shown or with a pump. This valve casing is provided with the ordinary tire valve *e*, provided with a protruding stem *f*, which valves are well known and need no further description. They allow the forcing of air into the chamber that they protect but will not permit its escape under ordinary circumstances. The central portion of the shell *a* has a corrugation *g* to let the spring ring *h* pack the edge of the diaphragm *i* into air-tight relation with respect to the shell. To the upper side of the diaphragm is connected an annular member *j*, and to the bottom of the diaphragm is connected a follower *k*. The member *j* and the follower *k* are attached to the diaphragm by screws *l* which pass through the follower *k* and the member *j* and pinch the diaphragm in between them. The follower *k* carries a valve *m* which guards an aperture through the diaphragm. The stem of this valve *m* protrudes vertically upward, and consequently when the diaphragm rises beyond a predetermined point, this stem strikes the point *n* of the cap *o* which closes the opening into the shell, and this contact between the valve *m* and the point *n* opens the valve and allows the escape of air through the opening guarded by the valve and out the opening *p* in the cap *o*. This opening *p* is part of the whistle *q* so a warning is sounded.

When the pressure in the tire falls below a predetermined point, the diaphragm *i* drops and, of course the follower *k* drops. This pulls off from its seat the valve *r* which slides upon the spindle that is carried upon the follower *k* and is spaced therefrom by a coiled spring. This unseating of the valve *r* allows an escape of air through the passage way *s*. This passage way *s* is also arranged so as to sound a whistle *t* as a warning. Immediately after this warning is given this passage way may be closed up by using the valve *u* so as to prevent further escape of the air.

What I claim is:

1. A device of the character described, having in combination, a closed shell provided with a check valve for the introduction of air, a flexible diaphragm dividing the shell into an upper and lower chamber each provided with an outlet and the lower chamber having the said check valve, a valve in the diaphragm opened when the air pressure exceeds a given amount, by reason of the upper travel of the diaphragm, and a second valve in the casing and controlling the outlet of the lower chamber, said second valve opened by the dropping of the diaphragm when the pressure is reduced below a given point, substantially as described.

2. A device of the character described, having in combination, a shell provided with a check valve for the introduction of air, a diaphragm dividing the shell into an upper and lower chamber, a valve in the diaphragm pushed off its seat by the rising of the diaphragm under pressure exceeding the given amount, and a second valve attached to the diaphragm and pulled off its seat in the shell by the dropping of the diaphragm, substantially as described.

3. A device of the character described, having in combination, a shell provided with a check valve for the introduction of air, a diaphragm dividing the shell into an upper and lower chamber, said shell being provided with an opening to the atmosphere in the upper chamber and an opening to the atmosphere in the lower chamber, an alarm device adjacent the opening out of the upper chamber, an alarm device adjacent the opening out of the lower chamber, a valve guarding the hole through the diaphragm and pushed off its seat when the diaphragm rises by pressure above a given amount, and a second valve below the diaphragm guarding the opening into the atmosphere into the lower chamber and attached to the diaphragm so that it will be pulled off its seat when the diaphragm drops below a given point, substantially as described.

4. A device of the character described, having in combination, a shell provided with a check valve for the introduction of air, a diaphragm dividing the shell into an upper and lower chamber, the said shell being provided with an opening to the atmosphere out of the upper chamber and also an opening to the atmosphere out of the lower chamber, a valve guarding the opening through the diaphragm and adapted to be pushed off its seat by the rising of the diaphragm when the pressure in the lower chamber exceeds a given point, a valve attached to the diaphragm and guarding the opening out of the lower chamber, the said second valve being adapted to being pulled off its seat when the diaphragm drops below a given point by reason of the reduction of the pressure in the lower chamber, an alarm device for indicating the escape of air through the opening out of the upper chamber, and an alarm device of different character for differentially indicating the escape of air out of the opening leading from the lower chamber to the atmosphere.

5. A device of the character described, having in combination, a shell provided with a check valve through which air may be introduced, a diaphragm dividing the shell into an upper and lower chamber, the said shell being provided with an opening leading out of the upper chamber and with an opening leading out of the lower chamber, a valve guarding the opening through the diaphragm and adapted to be pushed off its seat when the diaphragm rises under a pressure exceeding a given amount, a valve carried by the diaphragm and guarding the opening out of the lower chamber and adapted to be pulled off its seat when the diaphragm drops at the reduction of pressure, below a given amount, and means for stopping the escape of air from the opening leading out of the lower chamber to the atmosphere.

In testimony whereof, I sign this specification in the presence of two witnesses.

RALPH E. RELYEA.

Witnesses:
STUART C. BARNES,
VIRGINIA C. SPRATT.